United States Patent
Pileri et al.

[11] Patent Number: 6,085,593
[45] Date of Patent: Jul. 11, 2000

[54] VIBRATION DAMPING ELEMENT TEST APPARATUS

[75] Inventors: Pierluigi Pileri, Munich; Herbert Hoffelner, Markt Indersdorf, both of Germany

[73] Assignee: MTU Motoren-und Turbinen-Union Munchen GmbH, Munich, Germany

[21] Appl. No.: 09/140,442

[22] Filed: Aug. 26, 1998

[30] Foreign Application Priority Data

Sep. 4, 1997 [DE] Germany .......................... 197 38 595

[51] Int. Cl.⁷ .................................................. G01H 17/00
[52] U.S. Cl. ............................................ 73/663; 73/432.1
[58] Field of Search ............................. 73/11.04, 11.09, 73/574, 575, 593, 662, 663, 665, 671, 430, 432.1, DIG. 1

[56] References Cited

U.S. PATENT DOCUMENTS

| | | | |
|---|---|---|---|
| 4,350,043 | 9/1982 | Jones | 73/761 |
| 4,776,216 | 10/1988 | Barton et al. | 73/660 |
| 5,277,066 | 1/1994 | Marshall | 73/663 |
| 5,445,027 | 8/1995 | Zorner | 73/593 |
| 5,478,207 | 12/1995 | Stec | 416/219 R |
| 5,553,501 | 9/1996 | Gaddis et al. | 73/662 |
| 5,573,375 | 11/1996 | Barcza | 416/193 |

FOREIGN PATENT DOCUMENTS

| | | |
|---|---|---|
| 0 717 169 A1 | 6/1996 | European Pat. Off. . |
| 25 16 141 A1 | 10/1976 | Germany . |
| 34 13 162 C2 | 10/1984 | Germany . |
| 43 347 799 A2 | 4/1995 | Germany . |

OTHER PUBLICATIONS

ABB TECHNIK, "Die Messung von Schaufel–schwingungen", pp. 31–34, Sep. 1994.

*Primary Examiner*—Hezron Williams
*Assistant Examiner*—Rose M. Miller
*Attorney, Agent, or Firm*—Hill & Simpson

[57] ABSTRACT

The present invention relates to a testing apparatus for testing vibration damping elements of moving blades, with a mounting means to be attached to an oscillating apparatus, whereby a damping element to be tested is to be arranged between the mounting means and the blades, and at least one extendable body that can be charged with pressure is arranged between the mounting means and the damping element.

20 Claims, 2 Drawing Sheets

VIBRATION DAMPING ELEMENT TEST APPARATUS

BACKGROUND OF THE INVENTION

1. Field of the Invention

The present invention relates to the field of test devices and, more specifically, an apparatus for testing damping elements of moving blades. The invention employs a mounting means attached to an oscillating apparatus, in which at least two blades are mounted, and a damping element which is to be tested is arranged between the mounting means and the blades.

2. Description of the Related Art

Damping elements are used to eliminate undesired vibration in rotating components of turbines, such as the turbine moving blades. Because the moving blades are almost optimized with respect to material and shape, the use of damping elements is required given excessively high vibration of the blade sheets, which oscillate during operation. Experiments have shown that the damping elements, generally made of steel, effectively reduce the amplitude of the oscillating blade sheets by converting the energy into friction, whereby a frequency shift occurs.

Due to the expensive and costly assembly and measurement processes, it has proven disadvantageous to carry out the experiments for the design of the damping elements on a rotating, or actual system. In addition, the scattering of the measurement values of the individual blade sheets of a system is large, so that corresponding measurement results for a single test provide limited information.

In the design of damping elements, it is thus useful first to carry out preliminary experiments on a static system. In such preliminary experiments, at least two blade sheets are mounted in a test apparatus. These sheets are excited into oscillation by means of an oscillation apparatus, or respectively, a vibrating table, in which the test apparatus is fastened. In contrast to the rotating system, the frequency to be tested of the blade sheets can be set precisely, and the amplitude of vibration can be measured precisely with lasers for example. The measurement results that can be obtained supply specific information concerning the movement of the blade sheets, and form the foundation of a first design for the damping elements according to their mass and rigidity. The damping elements optimized in this way are subsequently subjected to final examination under conditions of actual operation in a rotating system.

However, in the preliminary experiments in the static system, problems arise in the simulation of the centrifugal force. In known testing apparatuses, for this purpose wires are fastened to the damping element to be tested, which is clamped between the moving blades and the mounting means. A tensile force is applied to the wires via a connection and a weight. The resultant force presses the damping elements against the moving blades and away from the testing apparatus. The forces that simulate the centrifugal force are thereby applied only at specific contact points to the damping element, and do not correspond to the actual operating conditions. In addition, the quality of the measurement results suffers from errors inherent in the expensive mechanical system.

Accordingly, one underlying object of the present invention is to create a testing apparatus of the above species, with which the centrifugal forces can be set as precisely as possible and one which can simulate conditions of use as closely as possible in the static system for the design of damping elements.

SUMMARY OF THE INVENTION

The present invention employs at least one expandable body that can be charged with pressure arranged between the mounting means and the damping element. An advantage of the inventive testing apparatus is that the body that can be charged with pressure can have various forms, such as a pillow, a tube, etc. The pressurized body does not press against the damping element merely at specific points so that the force simulating the centrifugal force does not influence the specific behavior of the component/of the blade sheet, and no deviation of the measurement values occurs. In addition, by means of simply adjusting the pressure, centrifugal forces of various magnitudes up to 6000 N can be simulated, and thus various operating conditions can be simulated.

Preferably, in the pressurized state, the body is supported on the mounting means, and presses in planar fashion against the damping element, whereby the body is most preferably arranged in a recess, and is thus embedded except for the portion pressing against the damping element. It is desirable that the damping element completely cover an open side of the recess, so that in the pressurized state the body presses against the largest possible surface of the damping element. Furthermore, it is desirable that in the pressurized state the body is applied entirely against a lower side of the damping element. The lower side being located over the recess. The body can preferably be charged with a pressure of up to 15 bar. It is most preferable that the body be made of an elastomer, whereby other elastic plastics or rubber can also be used.

In a preferred construction, the body is a tube, whereby the blades are preferably mounted one after the other in an oblong groove fashioned in the base of the mounting means, on both sides of which groove one such tube is respectively provided, extending parallel to the groove.

It is advantageous that the tubes are respectively arranged, and thus embedded, in an oblong recess that can be fashioned in the mounting means or in a support plate attached thereto and that can extend parallel to the groove.

Preferably, the cross-sectional surfaces of the tubes in the non-pressurized state are smaller than those of the recesses, whereby it is most preferable that the depth of the recess be smaller than the diameter of the tubes, so that in the non-pressurized state the tubes are pressed flat in the recess, and in the pressurized state they press with the largest possible surface against the damping element located thereabove.

It is desirable that the ends of the tubes removed from the pressure generation are combined to form one tube in which a pressure gauge is provided, so that the same pressure exists in both tubes and the damping element is pressed away as uniformly as possible over its surface.

Preferably, the base of the mounting means is bent outward in the direction of the blades arranged one after the other, i.e. in the longitudinal direction of the (mounting) groove, whereby the arrangement of the blades along a perimeter in the real system is approximated.

BRIEF DESCRIPTION OF THE DRAWINGS

The present invention is explained in more detail on the basis of an embodiment, with reference to the drawings wherein.

DETAILED DESCRIPTION OF THE PREFERRED EMBODIMENTS

Figure 1:
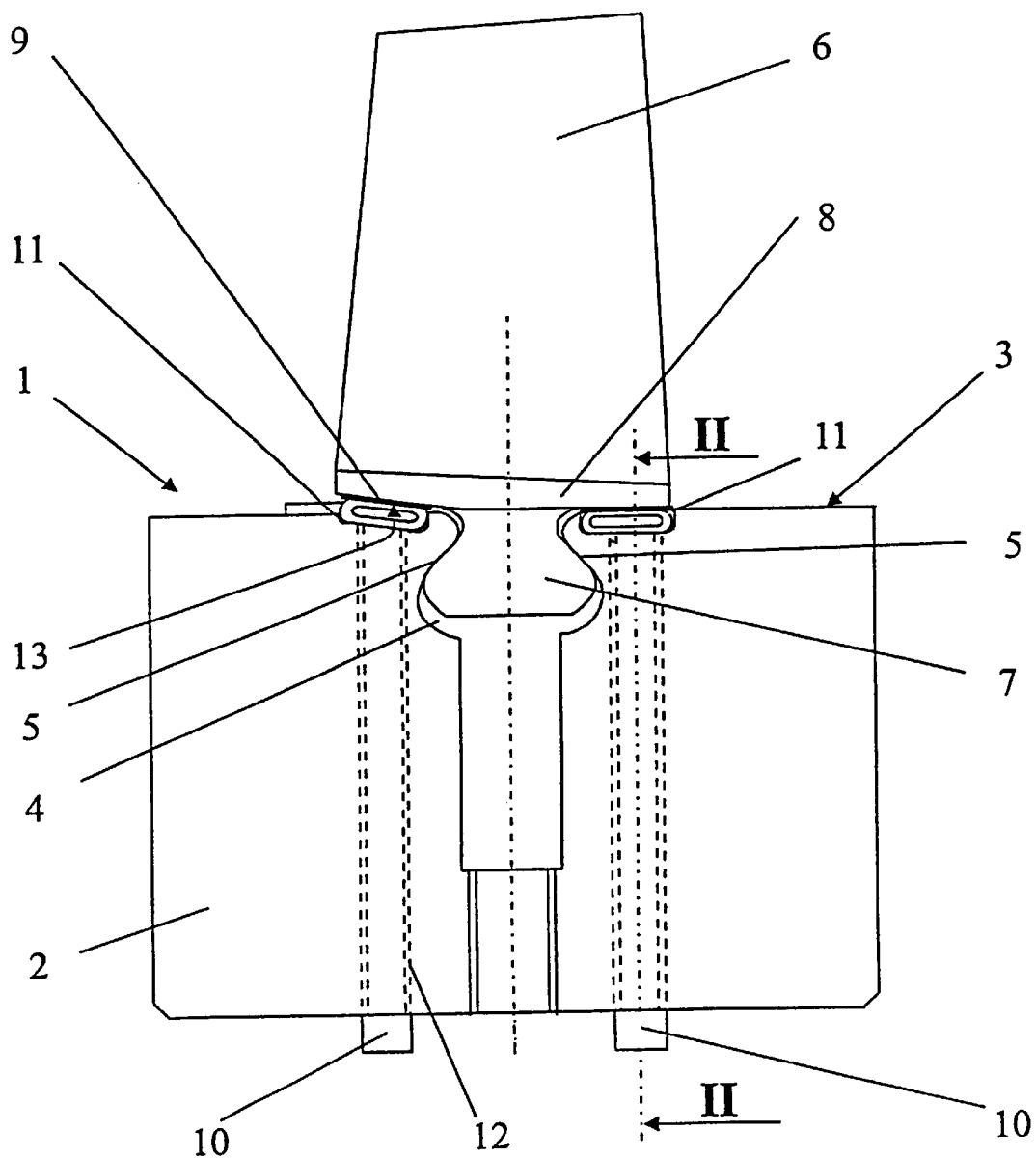
FIG. 1 illustrates a side view of the embodiment of the inventive testing apparatus.

FIG. 1 illustrates an embodiment of the inventive test apparatus of the present invention designated as 1 wherein the testing apparatus for damping elements for moving blades is shown schematically in a side view. The testing apparatus 1 comprises a mounting means 2 fastened on an oscillation means or, respectively, what is called a shaker (not shown). The mounting means 2 comprises a base 3 in which is fashioned an oblong groove 4 with undercuts 5. In the groove 4 shown in cross-section in FIG. 1, two blades 6 are mounted with their feet or, respectively, projections 7, which cooperate with the undercuts 5 of the groove 4. The blades 6 are mutually supported on their platforms 8, which serve as inner flow limiters, and are thus mounted one after the other in the same way as is done along a perimeter in an actual system. The perimeter is indicated by the curvature of the base 3, shown in FIG. 2. The base 3 can also readily be of flat construction in the static system.

Underneath the platforms 8 of the blade sheets 6, a damping element 9 to be tested is arranged, which in general is clamped there in such a way that the blades 6 and the mounting means 2 are clamped with one another. The damping elements 9 are generally made of (steel) plate, and can comprise various shapes, e.g. flat, wedge-shaped, etc. The damping elements 9 serve to reduce excessively large vibrations of the blade sheets 6, which oscillate during operation, by converting the energy into friction. In order to achieve as efficient a damping as possible, the damping elements 9 are first designed in the context of preliminary experiments in the testing apparatus 1, i.e. in a static system, with respect to their mass and rigidity.

For the simulation of the centrifugal forces arising in the real, rotating system, two expandable or elastic bodies 10, such as (rubber) tubes, that can be charged with pressure are provided underneath the damping element 9. The two tubes 10 are respectively embedded in an oblong recess 11 that extends parallel to the groove 4 and comprises a constant cross-section. In the present embodiment, one of the two recesses 11 has a smaller depth than the other, so that the corresponding tube 10 is laterally supported by an additional part. In general, however, the two recesses 11 have identical dimensions and are thus equally deep.

Figure 2:
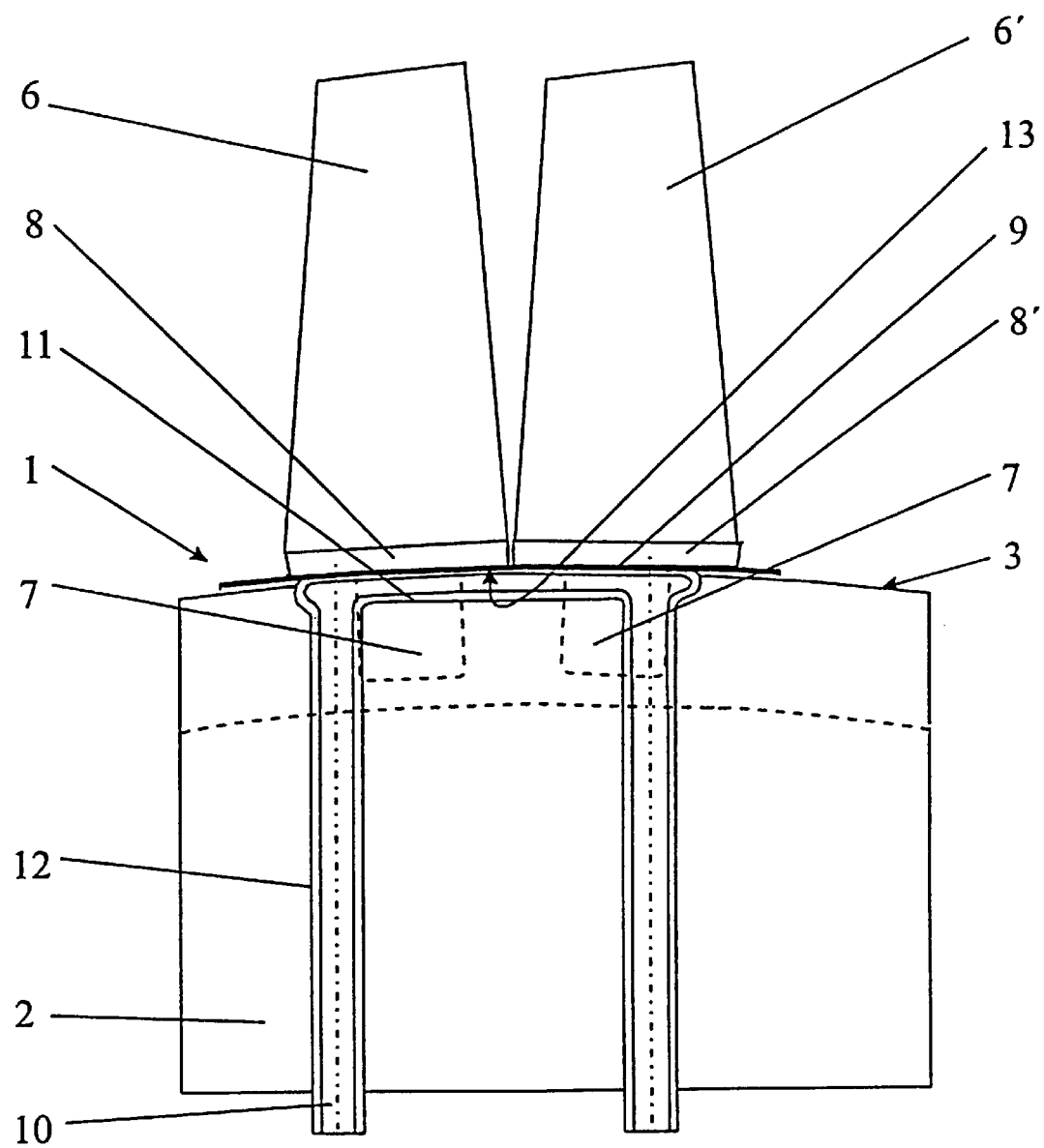
FIG. 2 shows a side view in section along the line II—II from FIG. 1, whereby, for the sake of clarity, the sectioned parts are not hatched.

As shown in FIG. 2, the recesses 11 extend approximately over the entire length of the two blades 6 arranged one after the other, i.e. from a first end of the platform 8 of the blade 6 up to a second, opposite end of the platform 8' of the other blade 6'. The tubes 10 are respectively led through a bore 12, which for easy manufacture runs approximately at a right angle to the base 3 of the mounting means 2, at an end of the recess 11, and are led away from the other, opposite end of the recess 11 through another such bore 12. The respective passages from the bores 12 to the two recesses 11 extending essentially parallel to the base 3 take place with radii sufficiently large that no buckling of the tubes 11 takes place. The width of the recesses 11 is greater than the diameter of the tube 10 in the non-pressurized state, and the depth of the recesses is smaller than this diameter.

In the present construction, the damping element 9 lies with its lower side 13 on the base 3, and covers the upper, open side of the recess 11 approximately completely. As a result, as can be seen in FIG. 1, according to the arrangement of the damping element 9 the tubes 10 are pressed flatly together in the non-pressurized state.

In carrying out the preliminary experiments for designing the damping elements 9 with respect to mass and rigidity, the blade sheets 6 are excited into oscillation by the oscillation means (not shown), to which the mounting means 2 is fastened. The frequencies that can thereby be set are freely selectable within a large range, and are located for example between 1,000 and 10,000 Hz. In this way, a wide variety of operating conditions can be investigated in the static system.

For simulating centrifugal forces occurring in the rotating system, pressure, which can be up to 15 bar, is applied to the tubes 10. As FIG. 2 shows, as a result of the pressure the elastic tubes 10 expand, and completely fill the recesses 11. The tubes 10 are thereby applied against the walls of the recesses 11 and against the lower side 13—lying over the recesses 11—of the damping element 9, and thus press the damping element 9 arranged between the tubes 10 and the platforms 8, 8' of the blade sheets 6, 6' away from the mounting means 2, together with the blade sheets 6. The pressure is thus applied to the damping elements 9 in planar fashion. In this way, centrifugal forces of up to approx. 6000 N can be simulated. During the preliminary experiments in a static system, as in the inventive testing apparatus 1, the occurrent amplitudes of the oscillating blade sheets 6 can be measured precisely by means of lasers or the like. In addition, it is possible to examine different damping elements 9 at various parameters (frequency, pressure), without requiring expensive assembly operations for this purpose, as are required for experiments in the (real) rotating system simply by exchanging the elements.

The present invention is subject to many variations, modifications and changes in detail. It is intended that all matter described throughout the specification and shown in the accompanying drawings be considered illustrative only. Accordingly, it is intended that the invention be limited only by the spirit and scope of the appended claims.

We claim as our invention:

1. A testing apparatus for testing a vibration damping element comprising:
   a mount attached to a mechanical oscillator, at least one blade mounted to the mount, a vibration damping element arranged between the mount and the blade, and at least one expandable body secured between the mount and the vibration damping element.

2. A testing apparatus according to claim 1, wherein in a pressurized state the expandable body is supported on the mount and presses against the damping element substantially along a common plane.

3. A testing apparatus according to claim 1, wherein the expandable body is attached in a recess formed in a surface of the mount.

4. A testing apparatus according to claim 3, wherein the surface is in a base of the mount.

5. A testing apparatus according to claim 3, wherein the recess is formed in a top surface of a support plate located on the base of the mount.

6. A testing apparatus according to claim 3, wherein the damping element completely covers an open side of the recess.

7. A testing apparatus according to of claim 3, wherein in a pressurized state, the expandable body extends across a lower side of the damping element located above the recess.

8. A testing apparatus according to claim 1, wherein the expandable body has a maximum internal pressure of 15 bar.

9. A testing apparatus according to claim 1, wherein the expandable body is comprised of an elastomer.

10. An apparatus according to claim 1, wherein the expandable body is a tube.

11. A testing apparatus according to claim 10, wherein first and second blades are mounted in a groove formed in the base of the mount and the groove has a tube extending parallel thereto.

12. A testing apparatus according to claim 11, wherein the tube is arranged in a recess formed in the mount.

13. A testing apparatus according to claim 12, wherein in a non-pressurized state, a cross-sectional surface of the tube is smaller than a cross-sectional surface of the recesses.

14. A testing apparatus according to claim 12, wherein a depth of the recess is smaller than a diameter of the tube.

15. A testing apparatus according to claim 10, wherein ends of the tubes that are removed from the pressure production are combined to form a tube in which a pressure gauge is provided.

16. A testing apparatus according to claim 1, wherein the base of the mount is bent outward toward the blades.

17. A method of testing a vibration damping element comprising the steps of:

securing a vibration susceptible device to a mounting member;

attaching a damping element to the vibration susceptible device;

securing an expandable member between the mounting member and the vibration susceptible device; and applying a force to the damping element by expanding the expandable member.

18. The method of testing a vibration damping element of claim 17, wherein the vibration susceptible device is a turbine blade.

19. The method of testing a vibration damping element of claim 17, wherein the step of securing the expandable member comprises placing the expandable member in a groove formed in the mounting member.

20. The method of testing a vibration damping element of claim 19, wherein the step of expanding the expandable member comprises increasing an internal pressure by injecting a gas into the expandable member.

* * * * *